(12) United States Patent
Parkes et al.

(10) Patent No.: US 8,600,680 B2
(45) Date of Patent: Dec. 3, 2013

(54) METHOD FOR ELIMINATING SPECTRAL CONSTRAINTS OF ACQUISITION SYSTEM AND EARTH FILTERING EFFECTS

(75) Inventors: Gregory Ernest Parkes, Corsham (GB); Stian Hegna, Hovik (NO); Anthony James Day, Drammen (NO)

(73) Assignee: PGS Geophysical AS, Oslo (NO)

( * ) Notice: Subject to any disclaimer, the term of this patent is extended or adjusted under 35 U.S.C. 154(b) by 310 days.

(21) Appl. No.: 13/066,036

(22) Filed: Apr. 5, 2011

(65) Prior Publication Data

US 2012/0259553 A1    Oct. 11, 2012

(51) Int. Cl.
*G01V 1/28* (2006.01)
*G01V 1/48* (2006.01)

(52) U.S. Cl.
USPC ......... 702/17; 702/5; 702/14; 702/18; 367/24

(58) Field of Classification Search
USPC ..................... 702/14, 17, 18, 5; 367/21, 24
See application file for complete search history.

(56) References Cited

U.S. PATENT DOCUMENTS

| | | | | |
|---|---|---|---|---|
| 4,752,916 A | * | 6/1988 | Loewenthal | 367/24 |
| 4,884,247 A | * | 11/1989 | Hadidi et al. | 367/43 |
| 6,832,161 B1 | * | 12/2004 | Moore | 702/17 |
| 7,489,590 B2 | * | 2/2009 | Grion | 367/24 |
| 7,791,980 B2 | * | 9/2010 | Robertsson et al. | 367/24 |
| 7,835,225 B2 | * | 11/2010 | Sollner et al. | 367/24 |

OTHER PUBLICATIONS

Ziolkowski, A. et al., 1982, "The signature of an airgun array: Computation from near-field measurements including interactions", Geophysics, vol. 47, p. 1413-1421.
Posthumus, B., 1993, "Deghosting of twin streamer configuration", Geophysical Prospecting, vol. 41, p. 267-286.
Fokkema, J.T., et al.; 1993; Seismic Applications of Acoustic Reciprocity; Elsevier; Amsterdam; Sections 10.1, 10.2, 11.4, 11.5; p. 199-210, 222-226.

* cited by examiner

*Primary Examiner* — Michael Nghiem
*Assistant Examiner* — Alexander Satanovsky

(57) ABSTRACT

Recorded seismic data are represented as a convolution of operators representing a reflectivity series of the earth and a seismic wavelet. The recorded seismic wavelet is represented as a convolution of operators representing a receiver ghost, a source ghost, a ghost-free source system response, an earth filter response, and a receiver system response. The operator representing the receiver ghost is removed from the convolution representing the seismic wavelet. The operator representing the source ghost is removed from the convolution representing the seismic wavelet. The operator representing the ghost-free source response is removed from the convolution representing the seismic wavelet. The operator representing the earth filter response is removed from the convolution representing the seismic wavelet. The operator representing the seismic wavelet is removed from the convolution representing the recorded seismic data.

18 Claims, 4 Drawing Sheets

METHOD FOR ELIMINATING SPECTRAL CONSTRAINTS OF ACQUISITION SYSTEM AND EARTH FILTERING EFFECTS

BACKGROUND

In the oil and gas industry, geophysical prospecting is commonly used to aid in the search for and evaluation of subsurface earth formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes. The seismic sensors generate signals, typically electrical or optical, from the detected seismic energy, which are recorded for further processing.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source.

The appropriate types of seismic sensors typically include particle velocity sensors, particularly in land surveys, and water pressure sensors, particularly in marine surveys. Sometimes particle displacement sensors, particle acceleration sensors, or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle motion sensors may be deployed together in a marine survey, collocated in pairs or pairs of arrays.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times (the activation commonly known as a "shot"). Seismic streamers, also called seismic cables, are elongate cable-like structures towed in the body of water by the seismic survey vessel that tows the seismic source or by another seismic survey ship. Typically, a plurality of seismic streamers are towed behind a seismic vessel. The seismic streamers contain sensors to detect the reflected wavefields initiated by the seismic source and returning from reflective interfaces.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION

Figure 1:
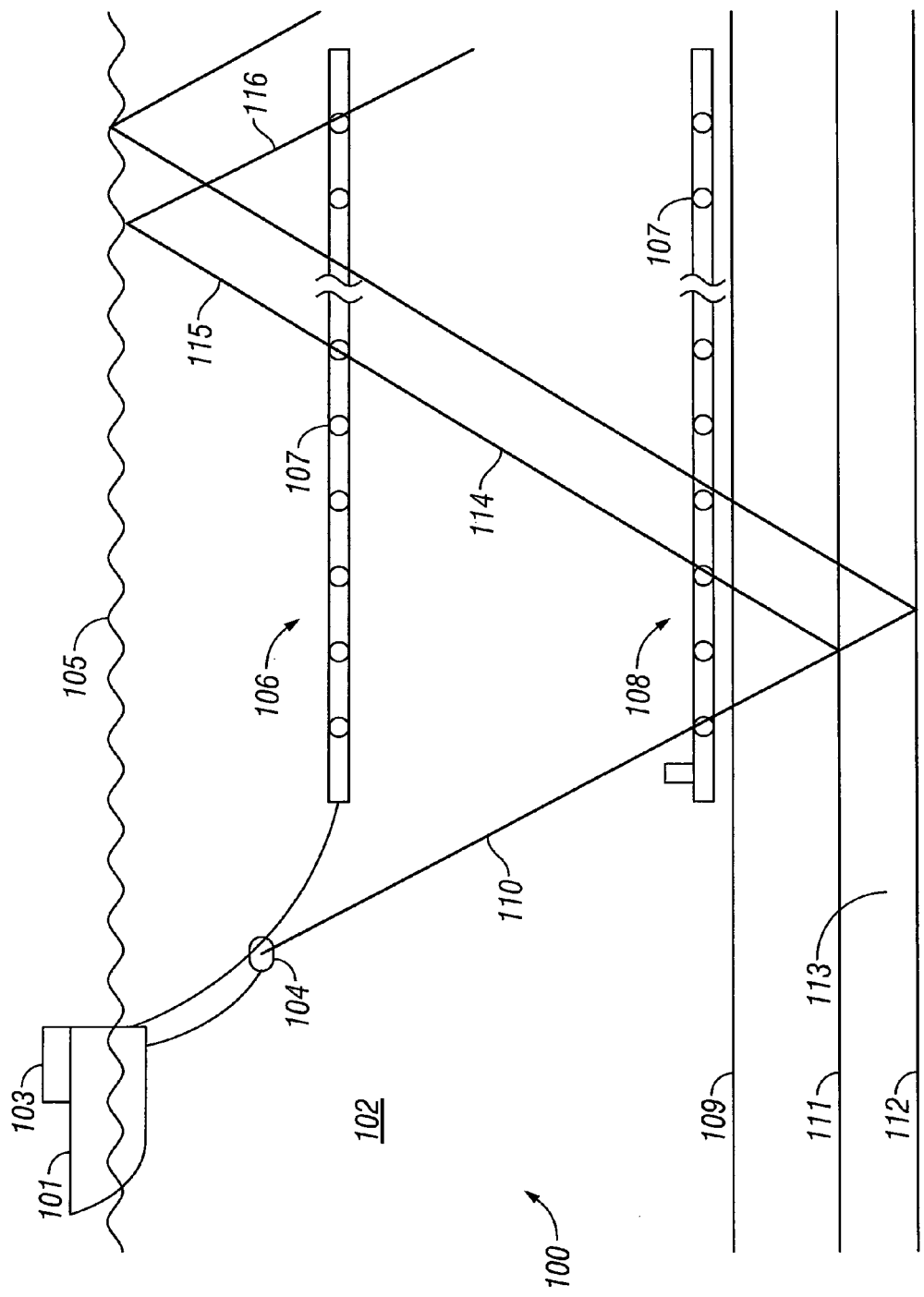
FIG. 1 is a diagram of a system for acquiring seismic data that can be used with seismic data processing methods according to the invention.

FIG. 1 is a diagram of an exemplary system for acquiring seismic data that can be used with seismic data processing methods according to the invention. In various embodiments, a single seismic sensor cable (also called a seismic streamer) or a single ocean bottom cable are shown for simplicity of illustration. This illustration of one cable is only meant to more clearly demonstrate principles of the invention and is not intended as a limitation of the invention.

In FIG. 1, the seismic acquisition system is designated generally as 100. A seismic vessel 101 is disposed in a body of water 102 and carries equipment 103 for navigation, seismic source control, and seismic sensor recording. The seismic vessel 101 or another service vessel (not shown) tows a seismic source 104 through the body of water 102 below the surface 105 of the water. The seismic source 104 comprises any appropriate type of source, typically in arrays. The configuration of seismic sources 104 used is not intended to be a limitation of the invention.

In one embodiment, the seismic vessel 101 or another service vessel (not shown) tows a seismic streamer 106 through the body of water 102. The seismic streamer 106 comprises seismic sensors 107 at spaced apart positions along the seismic streamer 106, so that the seismic streamer 106 containing the seismic sensors 107 is disposed in the body of water 102. The seismic sensors 107 are typically pressure sensors, such as hydrophones. In another embodiment, the seismic streamer 106 comprises a dual-sensor streamer, in which the seismic sensors 107 comprise pairs of collocated pressure and particle motion sensors. The particle motion sensors are typically particle velocity sensors, such as geophones, or accelerometers. The seismic sensors 107 typically comprise arrays of sensors at each spaced apart position. An alternative to having the pressure and particle motion sensors co-located is to have sufficient spatial density of sensors so that the respective wavefields recorded by the pressure and particle motion sensors can be interpolated or extrapolated to produce the two wavefield signals at the same location.

In another embodiment, the seismic vessel 101 or another service vessel (not shown) disposes an ocean bottom cable 108 on the water bottom 109. The ocean bottom cable 108 also comprises seismic sensors 107 at spaced apart positions along the cable, also typically in arrays of sensors at each spaced apart position. The seismic sensors 107 in the ocean bottom sensor 108 can also comprise pairs of pressure and particle motion sensors. In yet another embodiment, both seismic streamers 106 and ocean bottom cable 108 are employed. The type of sensors illustrated in the seismic acquisition system 100 is not intended to be a limitation of the invention. For example, in other embodiments, discrete seismic sensors 107 located at ocean bottom nodes (not shown) could be included in the seismic acquisition system 100.

When the seismic source 104 is activated, acoustic energy travels downwardly, at 110, through the body of water 102 and the water bottom 109 to layer boundaries, such as 111 and 112, surrounding a subterranean formation layer, such as 113. A portion of the acoustic energy is reflected from the layer boundary at 111 and travels upwardly, at 114. The upwardly traveling acoustic energy 114 is detected at seismic sensors 107 on the ocean bottom cable 108 or the seismic streamer 106. The upwardly traveling acoustic energy continues upward, at 115, until reflecting off the water surface 105 and then travels downwardly again, at 116. The downwardly traveling acoustic energy 116 may be detected again by seismic sensors 107 on the seismic streamer 106 or the ocean bottom cable 108, resulting in a ghost signal. The acoustic energy detected at the seismic sensors 107 may be recorded onto any type of appropriate storage media at any location, such as, but not restricted to, at the seismic streamer 106 or the ocean bottom cable 108, on the seismic vessel 101 or another service vessel, or onshore.

The object of the seismic method is to map the earth's geology using recorded seismic data, d(t), acquired during a seismic survey. The ideal end product to aim for would be the pure impulse response of the earth. This impulse response can be expressed as the reflectivity series of the earth, $e_{rs}(t)$. In reality, recorded seismic data comprises a convolution of the reflectivity series of the earth, $e_{rs}(t)$, with a seismic wavelet, $w_1(t)$:

$$d(t) = e_{rs}(t) * w_1(t),$$

where t is time and an asterisk "*" designates convolution.

The seismic wavelet, $w_1(t)$, comprises a combination of the various responses of the earth itself, the source, receiver and surface reflections or ghosts. In the past, there has never been a solution to correct for all of these responses. A need exists for removing the various responses imposed by the acquisition system and earth filtering effects from the seismic wavelet one by one. Once the seismic wavelet, $w_1(t)$, is determined, it can then be removed from the recorded seismic data, d(t). The final result is a reflectivity series of the earth, $e_{rs}(t)$, that very closely represents the ideal impulse response of the earth.

In one embodiment, the seismic wavelet, $w_1(h) = w_1(t,x,y,z,\theta,\phi)$, can be expressed as a convolution of operators (functions that determine the signatures) representing the receiver ghost, $g_r(t) = g_r(t,\theta,\phi)$, the source ghost, $g_s(t) = (t,\theta,\phi)$, the ghost-free source system response, $s_{ng}(t) = s_{ng}(t,\theta,\phi)$, the earth filter response, e(t) = e(t,x,y,z), and the receiver system response, r(t) = r(t,θ,φ). Here, t is time, θ and φ are emission angles, and x, y. and z are Cartesian spatial coordinates. For simplicity of illustration, the operators will be expressed in the time domain. Thus, in this embodiment, the recorded seismic wavelet is described as follows:

$$w_1(t) = g_r(t) * g_s(t) * s_{ng}(t) * e(t) * r(t) \tag{1}$$

The earth filter response, e(t), represents the frequency-dependent attenuation as the acoustic wave-field propagates through the earth.

All the components in Equation (1) above have an intrinsic directional response. The discussion that follows describes how each term can be removed. It should be implicitly understood that the full directional response can also be corrected for at the same times.

With a dual-sensor or multi-component towed streamer comprising both pressure sensors and motion sensors, the up-going and down-going wave-fields can be separated through scaled or weighted summation of the measured components. For example, in one exemplary embodiment, the up-going and down-going pressure wave fields, $P_u$ and $P_d$, respectively, can be calculated from the measured pressure wave-field P and vertical velocity wave-field component $V_z$ and expressed in the frequency domain as follows:

$$P_u(\omega) = \frac{1}{2}\left[P(\omega) - \frac{\rho\omega}{k_z}V_z(\omega)\right]$$

and $$P_d(\omega) = \frac{1}{2}\left[P(\omega) + \frac{\rho\omega}{k_z}V_z(\omega)\right],$$

where ω is rotational frequency, ρ is water density, and $k_z$ is vertical wavenumber, given by:

$$k_z = \sqrt{\left(\frac{\omega}{c}\right)^2 - k_x^2 - k_y^2},$$

where c is speed of sound in water and $k_x$ and $k_y$ are the horizontal wavenumbers in the x (typically inline) and y (typically cross-line) directions, respectively.

Since the up-going pressure wave-field, $P_u$, contains no down-going reflections, the receiver ghost is not present in $P_u$. Hence, the effects of the receiver ghost, $g_r(t)$, can be removed from the wavelet, $w_1(t)$, as expressed in Equation (1). At this stage, the following seismic wavelet, $w_2(t)$, is left:

$$w_2(t) = g_s(t) * s_{ng}(t) * e(t) * r(t). \tag{2}$$

Other methods exist in the prior art for determining and removing the effects of the receiver ghost, $g_r(t)$, from the seismic wavelet, $w_1(t)$. This description of one method is not intended to limit the invention. For example, in another exemplary embodiment, the receiver ghost, $g_r(t)$, is removed using a specially designed receiver system.

By using a seismic source in which the components are distributed in depth, the source ghost can be removed through a weighted summation of the source components distributed in depth. One example of such a source is an "over/under source". For example, in one exemplary embodiment, the method described in, Posthumus, B. [1993], "Deghosting of twin streamer configuration", *Geophysical Prospecting*, vol. 41, pp. 267-286, can be used for over/under sources (instead of streamers, as described in the article). Using the Posthumus method, the wave-field $W(\omega)$ without the source ghost can be calculated by the following in the frequency domain:

$$W(\omega) = \frac{O_1(\omega)G_1(\omega)^* + O_2(\omega)G_2(\omega)^*}{|G_1(\omega)|^2 + |G_2(\omega)|^2}.$$

Here $O_1(\omega)$ is the recorded signal corrected for the actual actuation time of the first source with respect to initiation of recording (time t=0) in the shot record, $O_2(\omega)$ is the recorded signal corrected for the actual actuation time of the second source with respect to initiation of recording (time t=0) in the shot source and compensating for its being closer to the reflectors than the first source, $G_1(\omega)$ is the source ghost for the first source, $G_2(\omega)$ is the source ghost for the second source, and a superscript asterisk "*" designates conjugation.

In this example embodiment, the source ghost operator, $g_1(t)$, for the first seismic source may be defined in the time domain as follows:

$$g_1(t) = \delta(t) - \delta\left(t - 2d_1 \frac{\cos(\alpha)}{c}\right),$$

and similarly, the source ghost operator, $g_2(t)$, for the second seismic source may be defined as $$g_2(t) = \delta(t) - \delta\left(t - 2d_2 \frac{\cos(\alpha)}{c}\right).$$

Here, $d_1$ is the operating depth of the first source; $d_2$ is the operating depth of the second source; $\alpha$ is the emission angle of the energy propagation from the source, relative to vertical; and $\delta$ is the Dirac delta operator.

Hence, the effects of the source ghost, $g_s(t)$, can be removed from the wavelet, $w_2(t)$, as expressed in Equation (2). At this stage, the following seismic wavelet, $w_3(t)$, is left;

$$w_3(t) = s_{ng}(t) * e(t) * r(t). \quad (3)$$

Other methods exist in the prior art for determining and removing the effects of the source ghost, $g_s(t)$, from the seismic wavelet, $w_2(t)$. This description of one method is not intended to limit the invention. For example, in another exemplary embodiment, the source ghost, $g_s(t)$, is removed using a specially designed source system.

The ghost-free source signature can be determined based on methods already known in the art. For example, in one exemplary embodiment, the so-called notional source signatures can be calculated either from measured data in the field or from simulated responses calibrated to field measurements. Such calculations are based on the "notional" source method as described in Ziolkowski, A., Parkes, G., Hatton, L. and Haugland, T., [1982], "The signature of an airgun array: Computation from near-field measurements including interactions", *Geophysics*, vol. 47, p. 1413-1421. The calculations of the notional source signatures need to take the interaction effects of the source ghost into account. However, when calculating the far-field signature(s) from the notional source signatures, the source ghost, $g_s(t)$, should not be included in the calculations. To derive the far-field signature for a source where components are distributed at different depths, the far-field signatures for each component need to be summed through a weighted summation method similar to that used for removing the source ghost in the measured data. The resultant ghost-free source signature can then be used as a basis for removing the response of the source.

The measurable signature $p_j(t)$ at the $j^{th}$ hydrophone is given by:

$$p_j(t) = \sum_{i=1}^{n} \left(\frac{1}{r_{ij} - tv_{ij}}\right) p'_i(t_{ij}), \text{ for } j = 1, 2, \ldots, n.$$

Here, $r_{ij}$ is the distance between the $i^{th}$ seismic source-generated air bubble and the $j^{th}$ hydrophone, $v_{ij}$ is a closing relative velocity between the $i^{th}$ bubble and the $j^{th}$ hydrophone, $p'_i$ is a weighted unknown signature, and $t_{ij}$ is given by:

$$t_{ij} = t - \frac{r_{ij} - 1}{c}.$$

Hence, the effect of the ghost-free source response, $s_{ng}(t)$, can be removed from the wavelet, $w_3(t)$, as expressed in Equation (3). At this stage, the following seismic wavelet, $w_4(t)$, is left:

$$w_4(t) = e(t) * r(t). \quad (4)$$

Other methods exist in the prior art for determining and removing the effects of the ghost-free source response, $s_{ng}(t)$, from the seismic wavelet, $w_3(t)$. This description of one method is not intended to limit the invention.

After going through these steps described above, and since the main effects on the spectrum imposed by the acquisition system have now been removed, it is now possible to accurately estimate the earth filter response, $e(t)$. For example, in one exemplary embodiment, assuming that the reflectivity series of the earth, $e_{rs}(t)$, is white, then the spectra derived from data after going through the steps above can be used directly to estimate the earth filter response, $e(t)$. This can be done in a time/depth and space variant manner. Once this is estimated, the effect of the earth filtering response, $e(t)$, can be removed from the wavelet, $w_4(t)$, as expressed in Equation (4). At this stage, the following seismic wavelet, $w_s(t)$, is left:

$$w_5(t) = r(t). \quad (5)$$

Other methods exist in the prior art for determining and removing the effects of the earth filter response, $e(t)$, from the seismic wavelet, $w_4(t)$. This description of one method is not intended to limit the invention.

The effects of the response of the receiver system, $r(t)$, can be determined and removed, for example, in the following exemplary embodiment. This response is typically a very broadband response. At the low frequency end, the response only attenuates very low frequencies to eliminate the DC component introduced by the in-sea electronics and the very high amplitude noise close to 0 Hz, caused by the sea surface, which is normally not perfectly flat. At the high frequency end, the response of the receiver system only attenuates the frequencies close to the Nyquist frequency in conjunction with the analogue to digital conversion, to avoid aliasing after the conversion to discrete time samples at a specified sampling rate. This sampling rate is normally specified such that frequencies well above those of interest can be fully recovered. Therefore, the response of the receiver system is very broadband, covering the entire spectrum of interest. However, since the response of the receiver system is known, typically through measurements, this response can be shaped to any other response if desired, through another deconvolution step.

After going through the steps described above, the seismic wavelet left is close to a perfect spike. The main limiting factor in terms of bandwidth is the signal to noise ratio. Since higher frequencies are attenuated at a faster rate than lower frequencies as the acoustic waves are propagating through the earth, the signal to noise ratio is typically decreasing at the higher frequencies, thus limiting more of the seismic signal bandwidth with increasing depth of propagation. Other methods exist in the prior art for determining and removing the effects of the receiver system response, r(t), from the seismic wavelet, $w_5(t)$. This description of one method is not intended to limit the invention.

Figure 2:
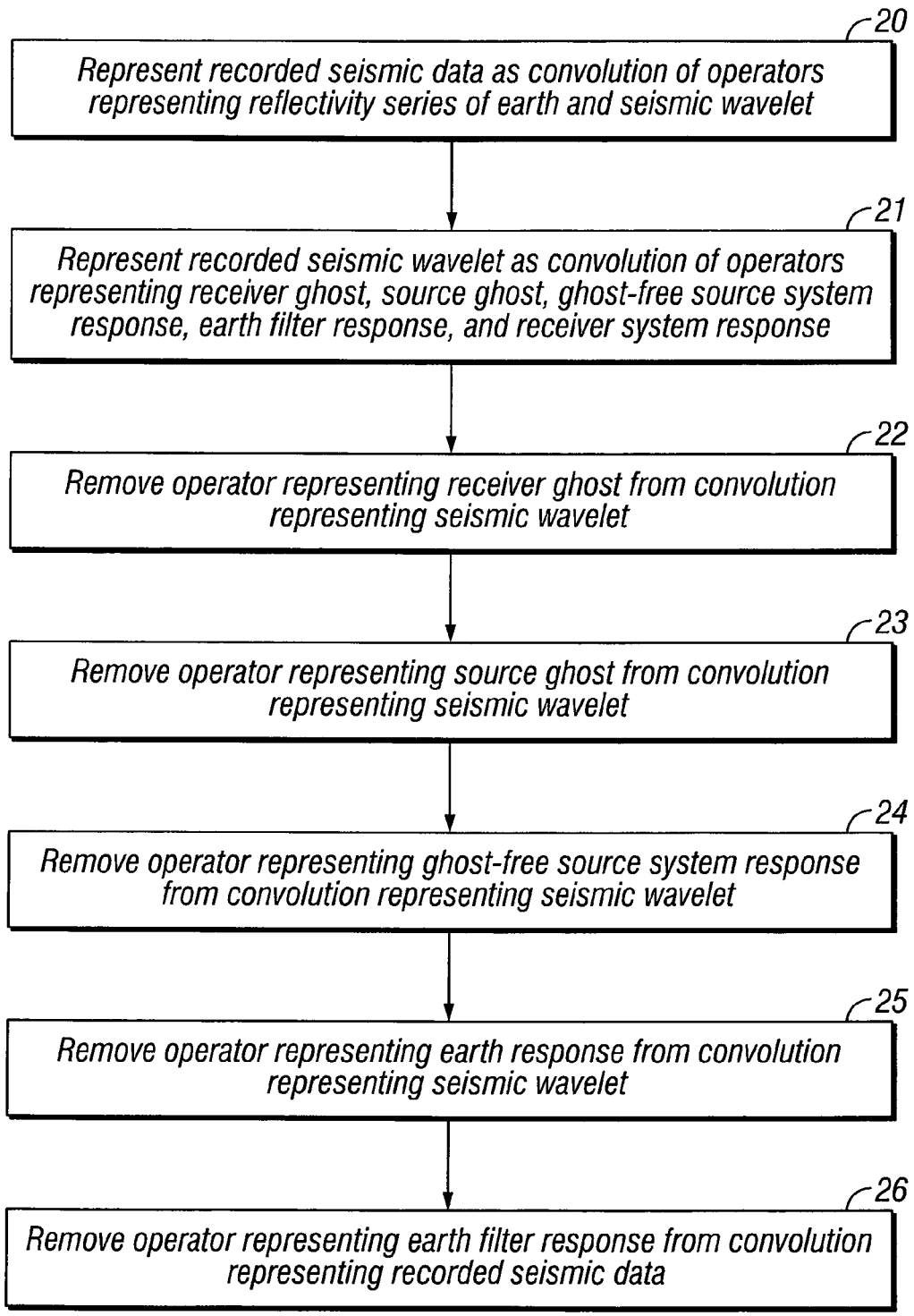
FIG. 2 is a flowchart illustrating an example embodiment of a method for mapping the earth's geology.

FIG. 2 is a flowchart illustrating an example embodiment of a method for mapping the earth's geology.

At block 20, recorded seismic data is represented as a convolution of operators representing a reflectivity series of the earth and a seismic wavelet.

At block 21, the operator representing the seismic wavelet is represented as a convolution of operators representing a receiver ghost, a source ghost, a ghost-free source response, an earth filter response, and a receiver system response.

At block 22, the operator representing the receiver ghost from block 21 is removed from the convolution representing the seismic wavelet in block 21.

At block 23, the operator representing the source ghost from block 21 is removed from the convolution representing the seismic wavelet in block 22.

At block 24, the operator representing the ghost-free source response from block 21 is removed from the convolution representing the seismic wavelet in block 23.

At block 25, the operator representing the earth filter response from block 21 is removed from the convolution representing the seismic wavelet in block 24.

At block 26, the operator representing the seismic wavelet is removed from the convolution representing the recorded seismic data in block 20.

Figure 3:
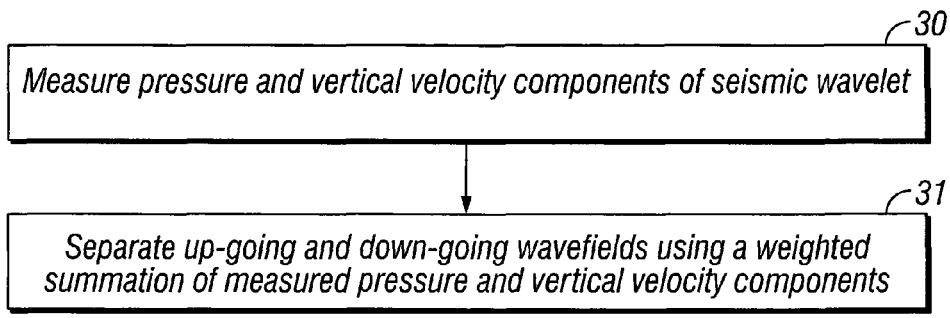
FIG. 3 is a flowchart illustrating an example embodiment of a method for removing the operator representing the receiver ghost from the convolution representing the seismic wavelet.

FIG. 3 is a flowchart illustrating an example embodiment of a method for removing the operator representing the receiver ghost from the convolution representing the seismic wavelet. FIG. 3 further describes a portion of the method in FIG. 2.

At block 30, pressure and vertical velocity components of the seismic wavelet are measured.

At block 31, up-going and down-going wavefields are separated using a weighted summation of the measured pressure and vertical velocity components from block 30.

Figure 4:
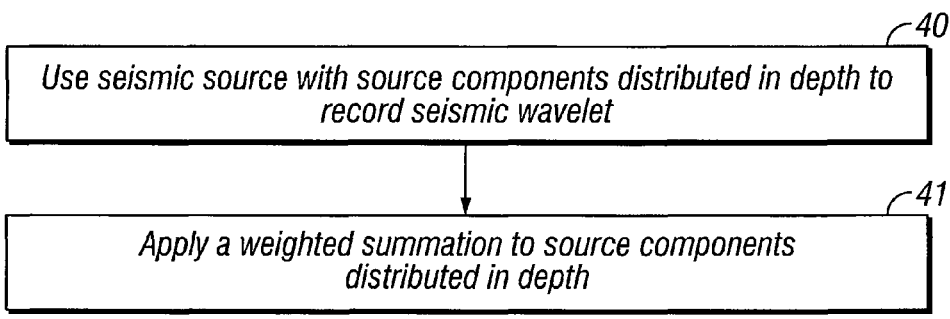
FIG. 4 is a flowchart illustrating an example embodiment of a method for removing the operator representing the source ghost from the convolution representing the seismic wavelet.

FIG. 4 is a flowchart illustrating an example embodiment of a method for removing the operator representing the source ghost from the convolution representing the seismic wavelet. FIG. 4 further describes a portion of the method in FIG. 2.

At block 40, a seismic source with source components distributed in depth is used to record the seismic wavelet.

At block 41, a weighted summation is applied to the source components distributed in depth from block 40.

Figure 5:
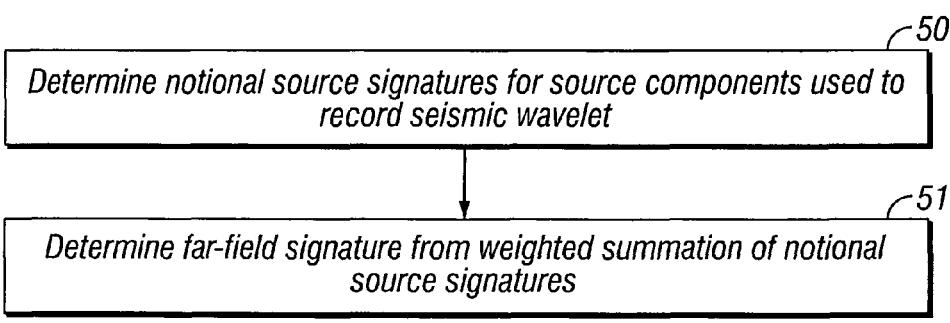
FIG. 5 is a flowchart illustrating an example embodiment of a method for removing the operator representing the ghost-free source response from the convolution representing the seismic wavelet.

FIG. 5 is a flowchart illustrating an example embodiment of a method for removing the operator representing the ghost-free source response from the convolution representing the seismic wavelet. FIG. 5 further describes a portion of the method in FIG. 2.

At block 50, notional source signatures are determined for the source components used to record the seismic wavelet; and At block 51, a far-field signature is determined from a weighted summation of the notional source signatures from block 50.

The seismic data obtained in performing a seismic survey, representative of earth's subsurface, are processed to yield information relating to the geologic structure and properties of the subsurface earth formations in the area being surveyed. The processed seismic data are processed for display and analysis of potential hydrocarbon content of these subterranean formations. The goal of seismic data processing is to extract from the seismic data as much information as possible regarding the subterranean formations in order to adequately image the geologic subsurface. In order to identify locations in the earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time. A prerequisite for discovery of any oil or gas reservoir is a well-resolved seismic image of the earth's subsurface.

The image of the structure of the earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the earth's subsurface that will improve the ability of an interpreter, whether the interpretation is made by a computer or a human, to assess the probability that an accumulation of petroleum exists at a particular location in the earth's subsurface. The processing and display of acquired seismic data facilitates more accurate decisions on whether and where to drill, and thereby reduces the risk of drilling dry holes.

The invention has been discussed above as a method, for illustrative purposes only, but can also be implemented as a system. The system of the invention is preferably implemented by means of computers, in particular digital computers, along with other conventional data processing equipment. Such data processing equipment, well known in the art, will comprise any appropriate combination or network of computer processing equipment, including, but not be limited to, hardware (processors, temporary and permanent storage devices, and any other appropriate computer processing equipment), software (operating systems, application programs, mathematics program libraries, and any other appropriate software), connections (electrical, optical, wireless, or otherwise), and peripherals (input and output devices such as keyboards, pointing devices, and scanners; display devices such as monitors and printers; computer readable storage media such as tapes, disks, and hard drives, and any other appropriate equipment).

In another embodiment, the invention could be implemented as the method described above, specifically carried out using a programmable computer to perform the method. In another embodiment, the invention could be implemented as a computer program stored in a computer readable medium, with the program having logic operable to cause a programmable computer to perform the method described above. In another embodiment, the invention could be implemented as a computer readable medium with a computer program stored on the medium, such that the program has logic operable to cause a programmable computer to perform the method described above.

Figure 6:
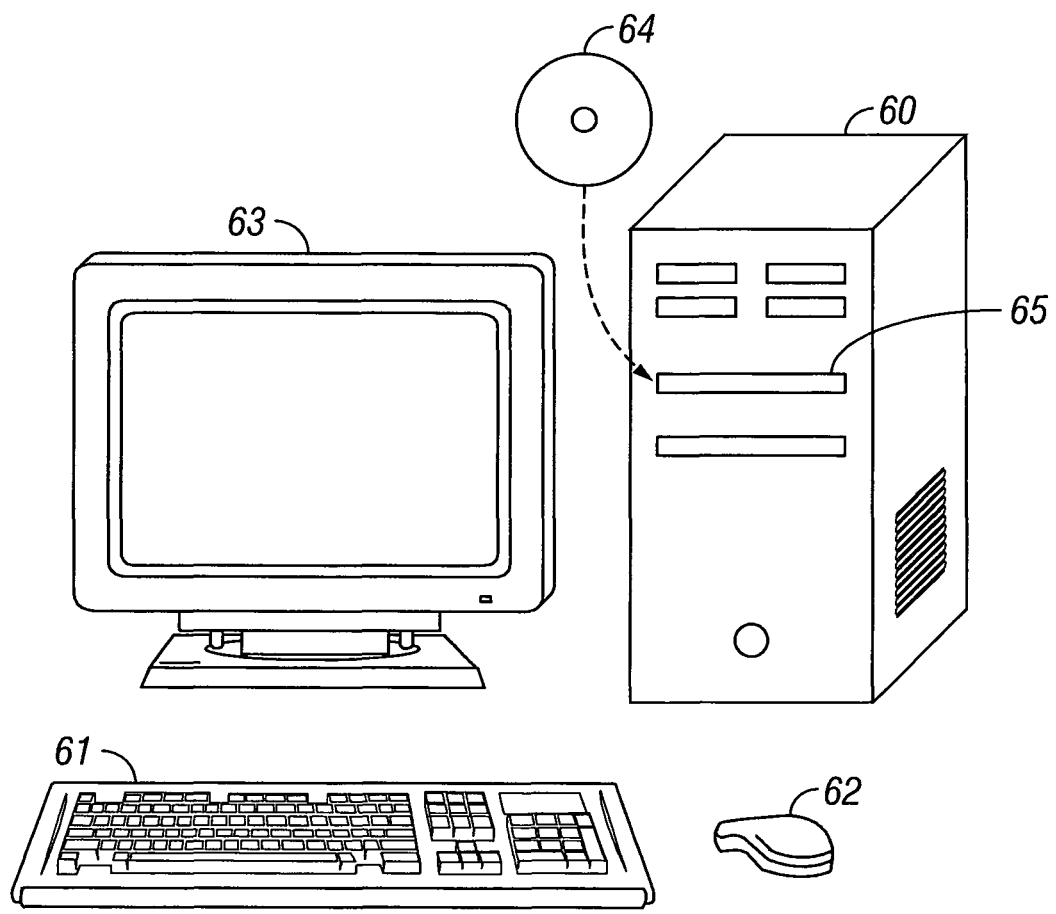
FIG. 6 is a diagram illustrating, by way of example, one of many different types of computer systems that can be used with seismic data processing methods according to the invention.

FIG. 6 is a diagram illustrating, by way of example, one of many different types of computer systems that can be used with seismic data processing methods according to the invention. A central processor 60 is coupled to user input devices, such as a keyboard 61 (wired or wireless) and a mouse 62 (wired or wireless). The processor 60 is further coupled to a display, such as a monitor 63. A computer program according to the invention may reside on any of a number of computer readable media, such as a disk 64 insertable into a disk drive 65 or on an internal or external hard drive (not shown).

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

We claim:

1. A method for mapping the earth's geology, comprising:
    using a programmable computer to perform at least the following:
        representing recorded seismic data as a convolution of time-dependent operators representing a reflectivity series of the earth and a seismic wavelet;
        representing the operator representing the seismic wavelet as a convolution of operators representing a receiver ghost, a source ghost, a ghost-free source response, an earth filter response, and a receiver system response;
        removing the operator representing the receiver ghost from the convolution representing the seismic wavelet;
        removing the operator representing the source ghost from the convolution representing the seismic wavelet;
        removing the operator representing the ghost-free source response from the convolution representing the seismic wavelet;
        removing the operator representing the earth filter response from the convolution representing the seismic wavelet; and
        removing the operator representing the seismic wavelet from the convolution representing the recorded seismic data.

2. The method of claim 1, wherein the removing the operator representing the receiver ghost from the convolution comprises:
    measuring pressure and vertical velocity components of the seismic wavelet; and
    separating up-going and down-going wavefields using a weighted summation of the measured pressure and vertical velocity wavefields.

3. The method of claim 1, wherein the removing the operator representing the receiver ghost from the convolution representing the seismic wavelet comprises:
    removing the receiver ghost using a specially designed receiver system.

4. The method of claim 1, wherein the removing the operator representing the source ghost from the convolution comprises:
    using a seismic source with source components distributed in depth to record the seismic wavelet; and
    applying a weighted summation to the source components distributed in depth.

5. The method of claim 1, wherein the removing the operator representing the source ghost from the convolution representing the seismic wavelet comprises:
    removing the source ghost using a specially designed source system.

6. The method of claim 1, wherein the removing the operator representing the ghost-free source response from the convolution comprises:
    determining notional source signatures for the source components used to record the seismic wavelet; and
    determining a far-field signature from a weighted summation of the notional source signatures.

7. A system for mapping the earth's geology, comprising:
    means for representing recorded seismic data as a convolution of time-dependent operators representing a reflectivity series of the earth and a seismic wavelet;
    means for representing the operator representing the seismic wavelet as a convolution of operators representing a receiver ghost, a source ghost, a ghost-free source response, an earth filter response, and a receiver system response;
    means for removing the operator representing the receiver ghost from the convolution representing the seismic wavelet;
    means for removing the operator representing the source ghost from the convolution representing the seismic wavelet;
    means for removing the operator representing the ghost-free source response from the convolution representing the seismic wavelet;
    means for removing the operator representing the earth filter response from the convolution representing the seismic wavelet; and
    means for removing the operator representing the seismic wavelet from the convolution representing the recorded seismic data.

8. The system of claim 7, wherein the removing the operator representing the receiver ghost from the convolution comprises:
    means for measuring pressure and vertical velocity components of the seismic wavelet; and
    means for separating up-going and down-going wavefields using a weighted summation of the measured pressure and vertical velocity wavefields.

9. The system of claim 7, wherein the removing the operator representing the receiver ghost from the convolution representing the seismic wavelet comprises:
    means for removing the receiver ghost using a specially designed receiver system.

10. The system of claim 7, wherein the removing the operator representing the source ghost from the convolution comprises:
    using a seismic source with source components distributed in depth to record the seismic wavelet; and
    means for applying a weighted summation to the source components distributed in depth.

11. The system of claim 7, wherein the removing the operator representing the source ghost from the convolution representing the seismic wavelet comprises:
    removing the source ghost using a specially designed source system.

12. The system of claim 7, wherein the removing the operator representing the ghost-free source response from the convolution comprises:
    means for determining notional source signatures for the source components used to record the seismic wavelet; and
    means for determining a far-field signature from a weighted summation of the notional source signatures.

13. At least one non-transitory computer readable medium with a computer program stored thereon, the program having logic operable to cause at least one programmable computer to perform a method comprising:
- representing recorded seismic data as a convolution of time-dependent operators representing a reflectivity series of the earth and a seismic wavelet;
- representing the operator representing the seismic wavelet as a convolution of operators representing a receiver ghost, a source ghost, a ghost-free source response, an earth filter response, and a receiver system response;
- removing the operator representing the receiver ghost from the convolution representing the seismic wavelet;
- removing the operator representing the source ghost from the convolution representing the seismic wavelet;
- removing the operator representing the ghost-free source response from the convolution representing the seismic wavelet;
- removing the operator representing the earth filter response from the convolution representing the seismic wavelet; and
- the operator representing the seismic wavelet is removed from the convolution representing the recorded seismic data.

14. The medium of claim 13, wherein the removing the operator representing the receiver ghost from the convolution comprises:
- measuring pressure and vertical velocity components of the seismic wavelet; and
- separating up-going and down-going wavefields using a weighted summation of the measured pressure and vertical velocity wavefields.

15. The medium of claim 13, wherein the removing the operator representing the receiver ghost from the convolution representing the seismic wavelet comprises:
- removing the receiver ghost using a specially designed receiver system.

16. The medium of claim 13, wherein the removing the operator representing the source ghost from the convolution comprises:
- using a seismic source with source components distributed in depth to record the seismic wavelet; and
- applying a weighted summation to the source components distributed in depth.

17. The medium of claim 13, wherein the removing the operator representing the source ghost from the convolution representing the seismic wavelet comprises:
- removing the source ghost using a specially designed source system.

18. The medium of claim 13, wherein the removing the operator representing the ghost-free source response from the convolution comprises:
- determining notional source signatures for the source components used to record the seismic wavelet; and
- determining a far-field signature from a weighted summation of the notional source signatures.

* * * * *